2,950,128
HITCHES FOR TRAILERS

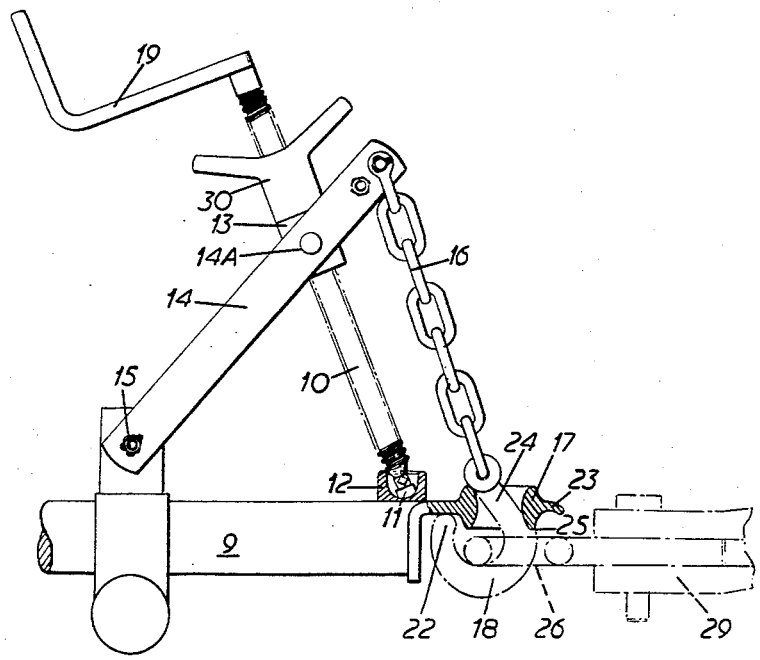

John B. Murray, Stewarton, Ayrshire, England, assignor to Massey-Ferguson (Great Britain) Limited, Manchester, England Filed Oct. 16, 1958, Ser. No. 767,535

Claims priority, application Great Britain Oct. 18, 1957

4 Claims. (Cl. 280—477)

The invention relates to a hitch for connecting a trailer to a towing vehicle, the expression "trailer" including any trailable device with or without wheels.

When connecting a trailer to a towing vehicle it is usually necessary to align exactly complementary coupling elements on the vehicle and trailer respectively before they can be connected together. This may be a difficult task, particularly so when the towing vehicle is itself a trailer which is hitched say to a tractor and to which it is desired to connect a further trailer.

It is an object of the invention to provide a simple hitch in which it is not necessary to align exactly the towing vehicle and the trailer in order to connect the complementary coupling elements together.

The accompanying drawing is a side view, partly in section, of an example of a hitch according to the invention.

The hitch shown is attached to the rear end of the frame 9 of a forage harvester which briefly is a wheeled machine attached behind a tractor to cut a crop and deliver it to a receiving vehicle hitched behind the harvester. The harvester accordingly is a towing vehicle and the receiving vehicle is its trailer. This trailer is usually a two-wheeled vehicle having a drawbar which when not in use rests on the ground and has to be lifted to attach it to the harvester. It will be appreciated that to reverse such a tractor-and-forage-harvester combination in order to position it correctly for connection of such a trailer has hitherto proved a difficult task.

The hitch includes a screw jack, one component of which is a screw rod 10 having a part-spherical lower end 11 which rests in a socket bearing 12 mounted on the rear of the frame 9 of the harvester. The other component of the screw jack is a nut-like block 13, which is pivoted at 14A to another part of the hitch, namely a lifting arm 14 consisting of two side-by-side bars of which only one is shown. The pivot 14A is between the two bars and near the rear end of this arm. Its front end is pivoted at 15 to a bracket on the harvester frame 9 and at its rear end there is anchored one end of a chain 16 which is suspended through a circular guide 17 connected to the frame 9 and which at its free end has a coupling member consisting of a hook 18.

If a worker turns the screw rod 10 by its handle 19 he will swing the arm 14 about the pivot 15, so that the hook 18 will be raised or lowered. In the position shown, the hook is fully raised, and further raising is prevented by the guide 17, which is engaged by the hook and serves as a seating member for the hook. As shown, the nose 22 of the hook contacts a flange 23 which extends completely round the guide 17, being integral with it; and the shank 24 of the hook is cut away to form a catch 25 which abuts against the lower edge of the guide 17. Thus, the trailer eye 26, which the hook engages, cannot free itself from the hook while the arm 14 is raised and the chain 16 is taut.

To connect the trailer, the arm 14 is more or less completely lowered so that the chain 16 is slackened and the forage harvester is positioned close to the trailer. The hook 18 is then attached to a complementary coupling member, namely the trailer eye 26, and the arm raised to indraw the chain until the hook reaches the fully engaged position shown in the drawing. Since the chain 16 is flexible, when the chain is slack there is considerable range of movement for the hook and thus it is not necessary to align the trailer and the harvester exactly.

To unhitch the trailer, the arm 14 is lowered by turning the handle 19 until the trailer drawbar 29 rests on the ground and the chain 16 slackens. The hook can then be easily detached from the eye 26, after which the arm is raised again.

In the example, a hand-turnable nut 30 on the screw rod 10 can be screwed hard against the nut-like block 13 in order to lock this block to the rod 10 when the arm 14 is raised to pull the hook 18 against the guide 17. Thus, it is ensured that the chain cannot slacken and the hook 18 cannot become detached from the eye 26.

If the trailer were of the two-wheel load-transfer type, having its wheels behind its centre of gravity, in which event it would be a heavy task to lift the drawbar 29 by hand, the screw jack 10, 13 enables the worker to raise the drawbar easily.

According to a modification, the screw jack is replaced by a hydraulic jack, which may be operable from the customary tractor hydraulic system. Alternatively, in any case when it is desired to hitch the trailer directly to the tractor, the customary tractor hydraulic lift mechanism, including the draft links of the tractor hitch, may be utilised instead of a jack to lift the chain, which in this case may be connected in any suitable manner to the draft links.

I claim:

1. A hitch connection for coupling a trailer unit to a towing vehicle comprising, in combination, a guide rigidly secured to the rear end of the towing vehicle and presenting a vertically disposed cylindrical opening encircled by a flange, an elongated arm pivoted at one end on the vehicle forwardly of said guide to swing vertically toward and from the guide, a flexible tension member anchored at one end to the free end of said arm and extending through the opening in said guide, a hook shaped coupling element secured to the other end of said tension member below said guide, a coupling element mounted on said trailer for engagement by said hook shaped element, means operable to swing said arm upwardly to draw said hook shaped element and the engaged coupling element of the trailer upwardly to complete a draft connection between the trailer and the vehicle, said hook shaped element having a nose portion engageable with the flange at one side of the guide opening and a shoulder portion spaced from said nose portion engageable with the guide to securely retain the coupling element of the trailer in engagement with the companion coupling element.

2. A hitch connection for coupling a trailer unit to a towing vehicle comprising, in combination, a guide rigidly secured to the rear end of the towing vehicle and presenting a vertically disposed cylindrical opening encircled by a flange, an elongated arm pivoted at one end on the vehicle forwardly of said guide to swing vertically toward and from the guide, a flexible tension member anchored at one end to the free end of said arm and extending through the opening in said guide, a hook shaped coupling element secured to the other end of said tension member below said guide, a coupling element mounted on said trailer for engagement by said hook shaped element, said arm when swung to its lower limit position slacking off said tension member to allow the hook shaped element to be engaged with the companion coupling element without requiring precise alinement of the vehicle and trailer, means for swinging said arm upwardly to draw the engaged coupling elements upwardly to complete a towing connection between the vehicle and the trailer, said hook shaped element having spaced nose and shoulder portions engageable with said guide to securely retain the coupling element of the tractor in engagement with the companion coupling element, and means for locking said arm in its upper position.

3. A hitch connection for coupling a trailer unit to a towing vehicle comprising, in combination, a guide rigidly secured to the rear end of the towing vehicle and presenting a vertically disposed cylindrical opening encircled by a flange, an elongated arm pivoted at one end on the vehicle forwardly of said guide to swing vertically toward and from the guide, a flexible tension member anchored at one end to the free end of said arm and extending through the opening in said guide, a hook shaped coupling element secured to the other end of said tension member below said guide, a coupling element mounted on said trailer for engagement by said hook shaped element, a nut element non-rotatably secured to said arm intermediate its ends, a threaded rod socketed at its lower end on the vehicle and threadedly engaged with said nut element, and means for rotating said rod to lower or raise said arm to slack off said tension member for engaging the coupling elements or for tensioning the member to draw the engaged coupling elements into position to effect a draft connection between the vehicle and the trailer.

4. A hitch connection for coupling a trailer unit to a towing vehicle comprising, in combination, a guide rigidly secured to the rear end of the towing vehicle and presenting a vertically disposed cylindrical opening encircled by a flange, an elongated arm pivoted at one end on the vehicle forwardly of said guide to swing vertically toward and from the guide, a flexible tension member anchored at one end to the free end of said arm and extending through the opening in said guide, a hook shaped coupling element secured to the other end of said tension member below said guide, a coupling element mounted on said trailer for engagement by said hook shaped element, a nut element non-rotatably secured to said arm intermediate its ends, a threaded rod socketed at its lower end on the vehicle and threadedly engaged with said nut element, a crank on said rod for manually rotating it to slack off or tension said member, and a lock nut threaded on said rod adapted to be screwed tight against said nut element to retain the arm in selected positions of adjustment.

References Cited in the file of this patent

UNITED STATES PATENTS

| | | |
|---|---|---|
| 1,395,945 | Clements | Nov. 1, 1921 |
| 1,398,575 | Ruggles | Nov. 29, 1921 |
| 1,924,235 | Fontaine | Aug. 29, 1933 |
| 2,736,575 | Gebhart | Feb. 28, 1956 |
| 2,753,192 | Davis et al. | July 3, 1956 |
| 2,826,433 | Poole | Mar. 11, 1958 |